US012533959B2

(12) United States Patent
Matsumoto

(10) Patent No.: US 12,533,959 B2
(45) Date of Patent: Jan. 27, 2026

(54) POWER SUPPLY CONTROL DEVICE AND POWER SUPPLY CONTROL METHOD

(71) Applicant: DENSO TEN Limited, Hyogo (JP)

(72) Inventor: Takeshi Matsumoto, Kobe (JP)

(73) Assignee: DENSO TEN Limited, Kobe (JP)

( * ) Notice: Subject to any disclaimer, the term of this patent is extended or adjusted under 35 U.S.C. 154(b) by 4 days.

(21) Appl. No.: 18/615,782

(22) Filed: Mar. 25, 2024

(65) Prior Publication Data

US 2024/0326598 A1 Oct. 3, 2024

(30) Foreign Application Priority Data

Mar. 29, 2023 (JP) .................................. 2023-053874

(51) Int. Cl.
*B60L 3/04* (2006.01)
*B60L 3/00* (2019.01)
*H02J 1/08* (2006.01)
*H02J 9/06* (2006.01)

(52) U.S. Cl.
CPC .............. *B60L 3/04* (2013.01); *B60L 3/0046* (2013.01); *H02J 1/086* (2020.01); *H02J 9/061* (2013.01)

(58) Field of Classification Search
CPC . B60L 3/04; B60L 3/0046; H02J 1/086; H02J 9/061; H02J 9/06; H02J 7/0048; H02J 7/0063

See application file for complete search history.

(56) References Cited

U.S. PATENT DOCUMENTS

2017/0349048 A1* 12/2017 Nakayama ................ B60L 3/04
2019/0115176 A1* 4/2019 Yasunori ................. B60R 16/03

FOREIGN PATENT DOCUMENTS

JP 2017-063551 A 3/2017
JP 2019-149921 A 9/2019

* cited by examiner

*Primary Examiner* — Lincoln D Donovan
*Assistant Examiner* — Alex W Lam
(74) *Attorney, Agent, or Firm* — Oliff PLC

(57) ABSTRACT

A controller of a power supply control is configured to: in response to a failure of a main power supply being detected, execute a fail-safe control in which a connector is interrupted and electric power from a backup power supply is supplied to a second load; in response to a state value indicating a charging state of the backup power supply decreasing to a first threshold during the fail-safe control, execute an advance notice process for giving a user advance notice that a vehicle will be stopped; and in response to the state value decreasing to a second threshold which is smaller than the first threshold and which indicates a safety limit of the backup power supply, execute a power supply stop process for stopping supply of the electric power from the backup power supply.

14 Claims, 10 Drawing Sheets

POWER SUPPLY CONTROL DEVICE AND POWER SUPPLY CONTROL METHOD

CROSS-REFERENCE TO RELATED APPLICATIONS

This application is based upon and claims the benefit of priority from prior Japanese patent application No. 2023-53874, filed on Mar. 29, 2023, the entire contents of which are incorporated herein by reference.

TECHNICAL FIELD

Embodiments disclosed herein relate to a power supply control device and a power supply control method.

RELATED ART

There has been known a technique for performing a fail-operational control (retreat travel control) using a backup power supply when a failure occurs in a main power supply during autonomous driving of a vehicle (for example, see JP2017-63551A). In this related art, the supply of electric power from the backup power supply under the fail-operational control is not limited. Therefore, in the related art, in a case where the electric power from the backup power supply falls below a safety limit under the fail-operational control, the backup power supply may fail and may not be used again.

As a technique for preventing a failure of a backup power supply due to over-discharge under the fail-operational control, a technique is known in which, when a state of charge (SOC) of a battery falls below a lower limit during retreat travel under the fail-operational control, the power supply is interrupted to forcibly end the retreat travel (for example, see JP2019-149921A).

SUMMARY

A driver, however, may be confused when the retreat travel is forcibly ended under the fail-operational control.

An aspect of the embodiment has been made in view of the above, and an object thereof is to provide a power supply control device and a power supply control method capable of ending retreat travel without confusing a driver while preventing a failure of a backup power supply.

According to an aspect of the present disclosure, there is provided a power supply control device including: a controller configured to control a connector, the connector being capable of connecting and interrupting a first system and a second system, the first system being configured to supply electric power from a main power supply to a first load, the second system being configured to supply electric power from a backup power supply to a second load, in which the controller is configured to: in response to a failure of the main power supply being detected, execute a fail-safe control in which the connector is interrupted and the electric power from the backup power supply is supplied to the second load; in response to a state value indicating a charging state of the backup power supply decreasing to a first threshold during the fail-safe control, execute an advance notice process for giving a user advance notice that a vehicle will be stopped; and in response to the state value decreasing to a second threshold which is smaller than the first threshold and which indicates a safety limit of the backup power supply, execute a power supply stop process for stopping supply of the electric power from the backup power supply.

A power supply control device according to an aspect of the embodiment may be capable of ending retreat travel without confusing a driver while preventing a failure of a backup power supply.

BRIEF DESCRIPTION OF DRAWINGS

Exemplary embodiment(s) of the present invention will be described in detail based on the following figures, wherein.

DESCRIPTION OF EMBODIMENTS

Hereinafter, embodiments of a power supply control device and a power supply control method will be described in detail with reference to the accompanying drawings. The present disclosure is not limited to the following embodiments. Hereinafter, a case where a vehicle on which the power supply control device according to the embodiment is mounted is an electric vehicle or a hybrid vehicle will be described.

The vehicle on which the power supply control device according to the embodiment is mounted may be an engine automobile that travels using an internal combustion engine. The power supply control device according to the embodiment is a device that is mounted on a vehicle having an autonomous driving function and supplies electric power to a load.

1. Configuration of Power Supply Control Device

Figure 1:
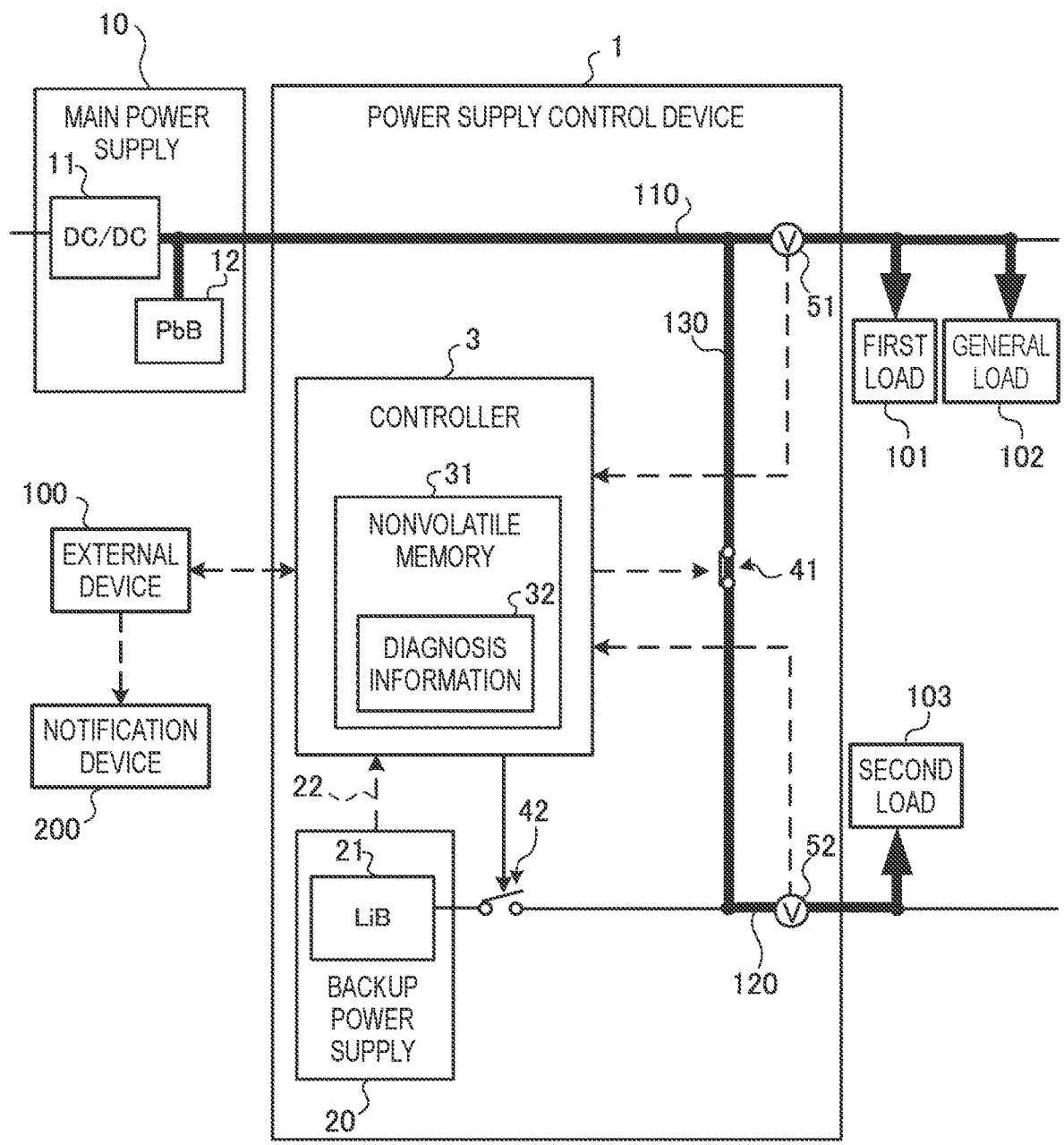
FIG. 1 is a diagram illustrating a configuration and an operation of a power supply control device according to an embodiment.

A configuration and an operation of a power supply control device 1 according to an embodiment will be described with reference to FIGS. 1 to 4. FIGS. 1 to 4 are diagrams illustrating the configuration and the operation of the power supply control device 1 according to the embodiment. As illustrated in FIG. 1, the power supply control device 1 according to the embodiment is connected to a main power supply 10, a first load 101, a general load 102, a second load 103, and an external device 100. The external device 100 is connected to a notification device 200.

The power supply control device 1 includes a first system 110 and a second system 120. The first system 110 is a power supply system that supplies electric power from the main power supply 10 to the first load 101 and the general load 102. The second system 120 is a power supply system that supplies, to the second load 103, electric power from a backup power supply 20 to be described later.

The first load 101 includes a load for autonomous driving. The first load 101 includes a steering motor that operates during autonomous driving, an electric brake device, an in-vehicle camera, and the like. The general load 102 includes a display, an air conditioner, audio, video, and various lights.

The second load 103 has a part of an autonomous driving function of the first load 101. The second load 103 includes devices required at the minimum for a fail-operational control (retreat travel control), such as a steering motor, an electric brake device, and a radar. The first load 101, the general load 102, and the second load 103 operate with electric power supplied from the power supply control device 1.

The external device 100 is a device that executes an autonomous driving control of the vehicle by operating the first load 101 and the second load 103. When a power supply failure such as a ground fault occurs in the first system 110 during autonomous driving of the vehicle, the external device 100 may perform the fail-operational control using the second load 103. When a power supply failure such as a ground fault occurs in the second system 120, the external device 100 may execute the fail-operational control using the first load 101.

Specifically, when a power supply failure occurs during the autonomous driving, the external device 100 executes a retreat travel control of the vehicle and causes the vehicle to travel to a safe place and stop. When the retreat travel is normally completed, the external device 100 transmits a retreat travel completion notification indicating the completion to the power supply control device 1.

The main power supply 10 includes a DC/DC converter (hereinafter, referred to as "DC/DC 11") and a lead battery (hereinafter, referred to as "PbB 12"). The battery of the main power supply 10 may be any secondary battery other than the PbB 12.

The DC/DC 11 is connected to a generator and a high-voltage battery having a higher voltage than the PbB 12. The DC/DC 11 steps down a voltage of the generator and of the high-voltage battery and outputs the stepped-down voltage to the first system 110. The generator is an alternator that generates electric power by converting kinetic energy of a traveling vehicle into electricity. The high-voltage battery is a vehicle driving battery mounted on an electric vehicle or a hybrid vehicle.

In a case where the main power supply 10 is mounted on an engine automobile, the alternator (generator) is provided instead of the DC/DC 11. The DC/DC 11 charges the PbB 12, supplies electric power to the first load 101 and the general load 102, supplies electric power to the second load 103, and charges the backup power supply 20 to be described later.

The power supply control device 1 includes the backup power supply 20, an inter-system switch 41, a battery switch 42, a controller 3, a first voltage sensor 51, and a second voltage sensor 52. The backup power supply 20 is a backup power supply when the main power supply 10 cannot supply the electric power. The backup power supply 20 includes a lithium-ion battery (hereinafter, referred to as "LiB 21"). A battery of the backup power supply 20 may be any secondary battery other than the LiB 21.

The inter-system switch 41 is provided in an inter-system line 130 that connects the first system 110 and the second system 120. The inter-system switch 41 is an example of a connector capable of connecting and interrupting the first system 110 and the second system 120.

In the present embodiment, electrical connection between the first system 110 and the second system 120 by the inter-system switch 41 is referred to as conducting of the inter-system switch 41 or turning-on of the inter-system switch 41.

In the present embodiment, cutting of the electrical connection between the first system 110 and the second system 120 by the inter-system switch 41 is referred to as interrupting of the inter-system switch 41 or turning-off of the inter-system switch 41.

The inter-system switch 41 may be a DC/DC converter. In this case, the DC/DC converter is controlled by the controller 3. The DC/DC converter electrically connects the first system 110 and the second system 120 by starting an operation, and disconnects the electrical connection between the first system 110 and the second system 120 by stopping the operation.

The battery switch 42 is a switch that connects the backup power supply 20 to the second system 120. In the present embodiment, the electrical connection between the backup power supply 20 and the second system 120 by the battery switch 42 is referred to as conducting of the battery switch 42 or turning on the battery switch 42.

In the present embodiment, cutting off the electrical connection between the backup power supply 20 and the second system 120 by the battery switch 42 is referred to as interrupting of the battery switch 42 or turning off the battery switch 42.

The first voltage sensor 51 is provided in the first system 110. The first voltage sensor 51 detects a voltage of the first system 110 and outputs a detection result to the controller 3. The second voltage sensor 52 is provided in the second system 120. The second voltage sensor 52 detects a voltage of the second system 120 and outputs a detection result to the controller 3.

The controller 3 includes a microcomputer including a central processing unit (CPU), a read only memory (ROM), a random access memory (RAM), and the like, and various circuits. The controller 3 may be implemented by hardware such as an application specific integrated circuit (ASIC) or a field programmable gate array (FPGA).

Further, the controller 3 includes a nonvolatile memory 31. The nonvolatile memory 31 may be provided separately from the controller 3.

The controller 3 controls an operation of the power supply control device 1 by the CPU executing a program stored in the ROM by using the RAM as a work area. The controller 3 controls the inter-system switch 41 and the battery switch 42.

Further, the controller 3 acquires a state value indicating a charging state of the backup power supply 20, which is acquired from the backup power supply 20 via a state monitoring line 22. The state value indicating the charging state of the backup power supply 20 is, for example, a state of charge (SOC) of the LiB 21.

The LiB 21 is in a state where a remaining charge amount is maximum when the SOC is 100%. The LiB 21 is in a state where there is no remaining charge amount when the SOC is 0%. The controller 3 acquires, for example, the SOC of the LiB 21 as the state value indicating the charging state of the backup power supply 20. The controller 3 monitors the remaining charge amount of the backup power supply 20 based on the SOC of the LiB 21.

The controller 3 detects a failure of the main power supply 10 or the backup power supply 20 based on the detection results input from the first voltage sensor 51 and the second voltage sensor 52. For example, the controller 3 detects a failure of the first system 110 or the second system 120. The failure of the main power supply 10 includes a ground fault of the first system 110 and disconnection of the first system 110. The failure of the backup power supply 20 includes a ground fault of the second system 120. When a failure of the first system 110 or the second system 120 is detected, the controller 3 notifies the external device 100 of the detection.

Specifically, when a failure of the main power supply 10 or the backup power supply 20 is detected, the controller 3 outputs, to the external device 100, an autonomous driving prohibition signal indicating that autonomous driving is disabled. When a failure of the main power supply 10 or the backup power supply 20 is not detected, the controller 3 outputs, to the external device 100, an autonomous driving permission signal indicating that autonomous driving is enabled.

When a failure of the main power supply 10 or the backup power supply 20 is detected, the controller 3 causes the nonvolatile memory 31 to store diagnosis information 32 indicating the detection. In a case where the diagnosis information 32 is stored in the nonvolatile memory 31 at the time of the next startup, the controller 3 prohibits autonomous driving by the external device 100.

Specifically, the controller 3 prohibits the autonomous driving using the external device 100 by outputting, to the external device 100, the autonomous driving prohibition signal indicating that the autonomous driving is disabled. Accordingly, the power supply control device 1 may prevent the autonomous driving from being erroneously performed by the external device 100 even though the failure of the main power supply 10 or the backup power supply 20 is not resolved at the time of the next startup after the retreat travel is completed.

The notification device 200 includes, for example, a display and a speaker. The notification device 200 is controlled by the external device 100, and notifies a driver of the vehicle of various kinds of information by at least one of display and voice.

2. Normal Operation of Power Supply Control Device

The controller 3 controls the inter-system switch 41 and the battery switch 42 as illustrated in FIG. 1 at a normal time when no failure occurs in the main power supply 10 and the backup power supply 20. Specifically, the controller 3 interrupts the battery switch 42, conducts the inter-system switch 41, and supplies the electric power from the main power supply 10 to the first load 101, the general load 102, and the second load 103. The controller 3 outputs the autonomous driving permission signal to the external device 100 at the normal time when no failure occurs in the main power supply 10 and the backup power supply 20.

3. Power Supply Failure-Time Operation of Power Supply Control Device

Next, a power supply failure-time operation of the power supply control device 1 will be described with reference to FIGS. 2 to 4. The controller 3 detects the occurrence of a power supply failure by comparing a parameter related to the failure of the first system 110 or the second system 120 with a threshold.

Here, a case where the parameter related to the failure of the main power supply 10 is the voltage of the first system 110 and the parameter related to the failure of the backup power supply 20 is the voltage of the second system 120 will be described. Hereinafter, the voltage of the first system 110 detected by the first voltage sensor 51 will be referred to as a first system voltage V1. The voltage of the second system 120 detected by the second voltage sensor 52 is referred to as a second system voltage V2.

The parameter related to the failure of the main power supply 10 may be current flowing through the first system 110 or a current flowing through the second system 120. In this case, the power supply control device 1 includes a current sensor that detects the current flowing through the first system 110 and a current sensor that detects the current flowing through the second system 120. When the current flowing through the first system 110 or the current flowing through the second system 120 exceeds an overcurrent threshold, the controller 3 detects the occurrence of a ground fault.

Figure 2:
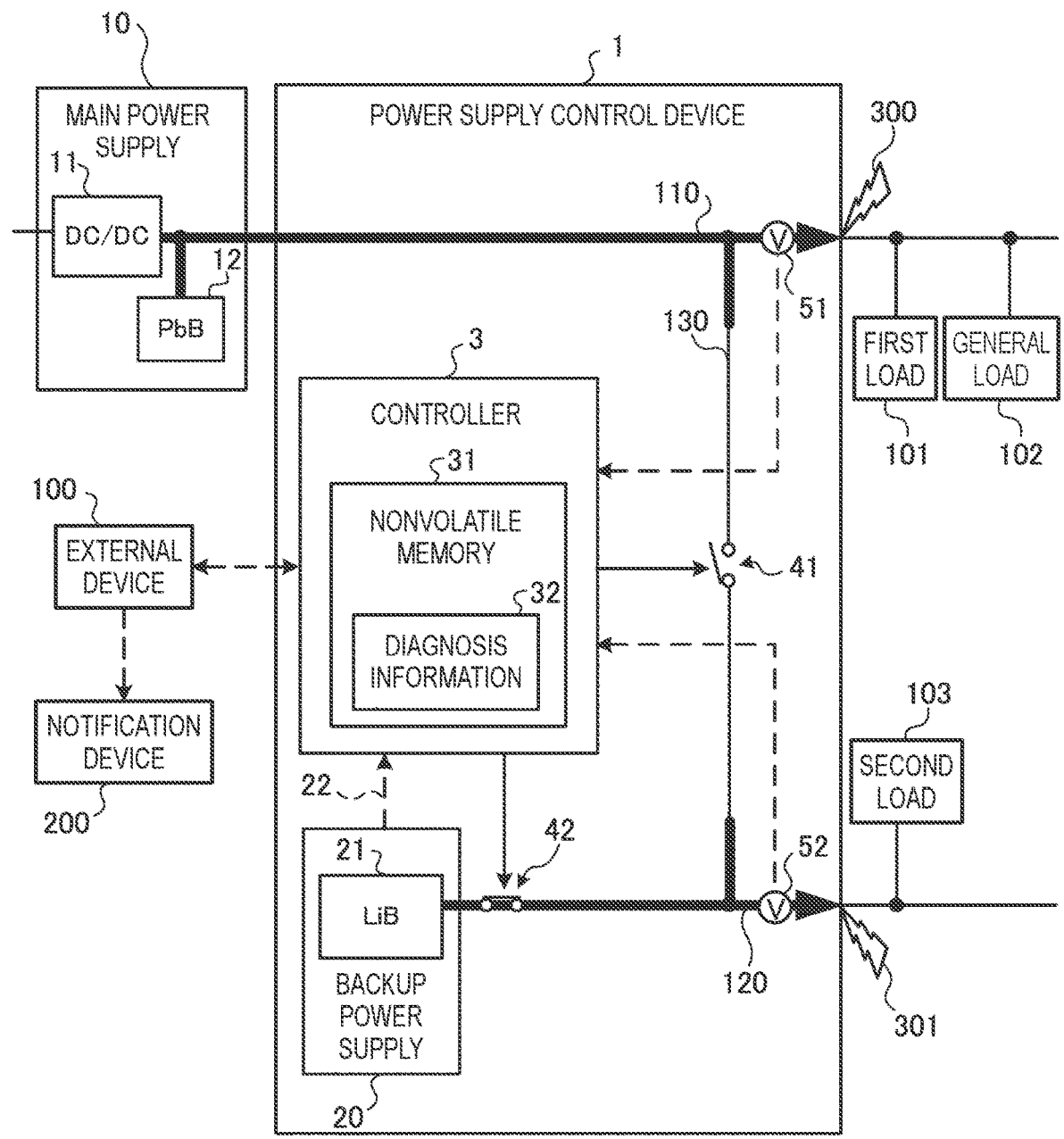
FIG. 2 is a diagram illustrating the configuration and the operation of the power supply control device according to the embodiment.

As illustrated in FIG. 2, in the power supply control device 1, when a ground fault 300 occurs in the first system 110, or when a ground fault 301 occurs in the second system 120, an overcurrent flows toward a ground fault point. Therefore, the first system voltage V1 and the second system voltage V2 become equal to or smaller than a ground fault threshold.

For example, when the second system voltage V2 is equal to or smaller than the ground fault threshold, the controller 3 temporarily determines that the ground fault 300 or the ground fault 301 occurs in the first system 110 or the second system 120. Thereafter, the controller 3 outputs the autonomous driving prohibition signal to the external device 100.

In a case where it is temporarily determined that the ground fault 300 or 301 occurs, the controller 3 turns off the inter-system switch 41 and turns on the battery switch 42. Accordingly, when the connection between the first system 110 and the second system 120 is cut, electric power is supplied from the main power supply 10 to the first system 110, and electric power is supplied from the backup power supply 20 to the second system 120. Hereinafter, the interruption of the inter-system switch 41 based on a result of the temporary determination is also referred to as pre-interruption.

When at least one of the first system voltage V1 and the second system voltage V2 is equal to or smaller than the ground fault threshold, the controller 3 may temporarily determine that a ground fault occurs in the first system 110 or the second system 120.

The temporary determination may be performed by a hard circuit having a comparator. In this case, the comparator compares the second system voltage V2 with the ground fault threshold. When the detected voltage is equal to or smaller than the ground fault threshold, the comparator turns off the inter-system switch 41 and turns on the battery switch 42 by outputting a failure detection signal indicating the temporary determination. After temporarily determining that a ground fault occurs in the first system 110 or the second system 120, the controller 3 performs a confirmation of the ground fault.

When the first system voltage V1 is equal to or smaller than the ground fault threshold continuously for a predetermined period or longer and the second system voltage V2 returns to be equal to or larger than a normal threshold that is larger than the ground fault threshold continuously for a predetermined period or longer after the pre-interruption, the controller 3 confirms that the second system 120 is normal and the ground fault 300 occurs in the first system 110. The predetermined period here is, for example, 100 ms. The predetermined period is not limited to 100 ms. The normal threshold is a value larger than the ground fault threshold.

Figure 3:
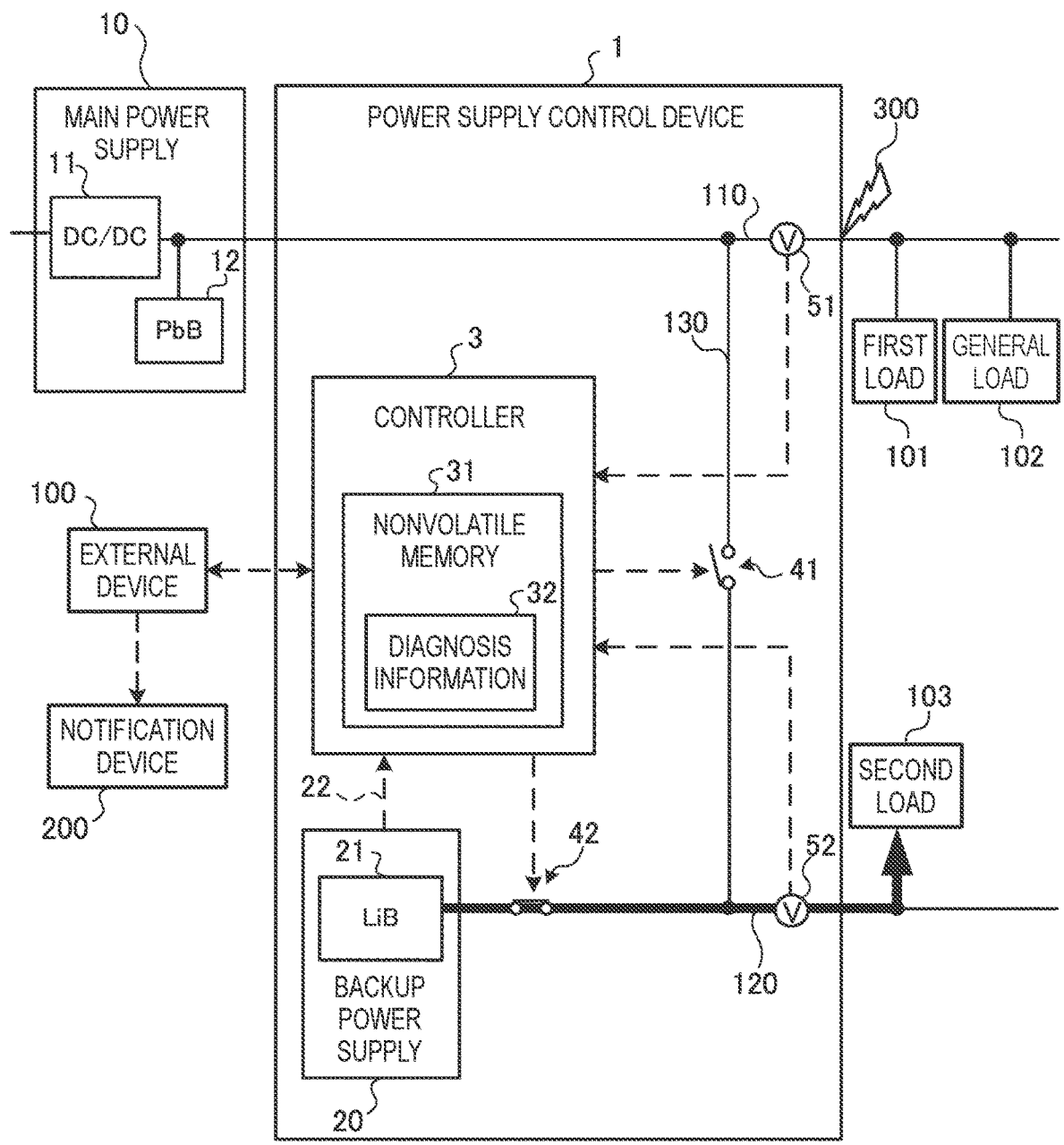
FIG. 3 is a diagram illustrating the configuration and the operation of the power supply control device according to the embodiment.

In a case where it is confirmed that the ground fault 300 occurs in the first system 110, as illustrated in FIG. 3, the controller 3 executes a fail-safe control for supplying electric power from the backup power supply 20 to the second load 103, and notifies the external device 100 of this fact. Accordingly, the external device 100 may operate the second load 103 with the electric power supplied from the backup power supply 20 to cause the vehicle to retreat to a safe place and stop. The fail-safe control may include interruption of the inter-system switch 41 by the temporary determination, conducting of the battery switch 42, and notification to the external device 100 at the time of the confirmation.

When the first system voltage V1 returns to be equal to or larger than the normal threshold continuously for the predetermined period or longer and the second system voltage V2 is equal to or smaller than the ground fault threshold continuously for the predetermined period or longer after the pre-interruption, the controller 3 confirms that the first system 110 is normal and the ground fault 301 occurs in the second system 120.

Figure 4:
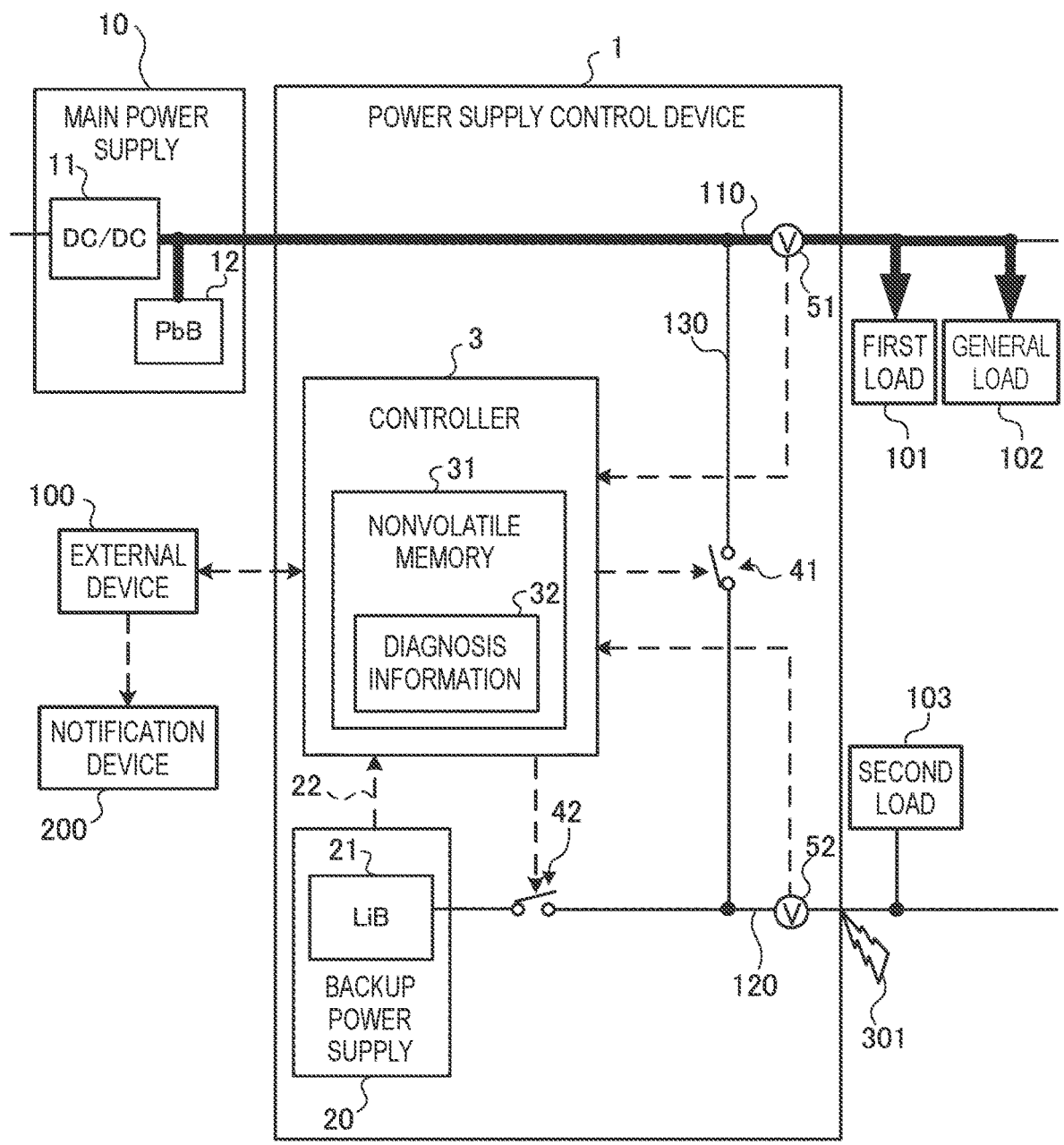
FIG. 4 is a diagram illustrating the configuration and the operation of the power supply control device according to the embodiment.

In a case where it is confirmed that the ground fault 301 occurs in the second system 120, as illustrated in FIG. 4, the controller 3 executes a fail-safe control in which the battery switch 42 is turned off and the electric power from the main power supply 10 is supplied to the first load 101 and the general load 102. The controller 3 notifies the external device 100 of the fact. Accordingly, the external device 100 may operate the first load 101 with the electric power supplied from the main power supply 10 to cause the vehicle to retreat to a safe place and stop.

When both the first system voltage V1 and the second system voltage V2 return to equal to or larger than the normal threshold continuously for the predetermined period or longer after the pre-interruption, the controller 3 determines that the voltages only temporarily decreased and neither the ground fault 300 nor 301 occurs. That is, the controller 3 confirms both the first system 110 and the second system 120 are in their normal states.

In this case, the controller 3 turns off the battery switch 42 from a pre-interruption state illustrated in FIG. 2, turns on the inter-system switch 41, and returns to a normal operation state illustrated in FIG. 1. Accordingly, the controller 3 may prevent an amount of electric power stored in the backup power supply 20 from decreasing.

Figure 5:
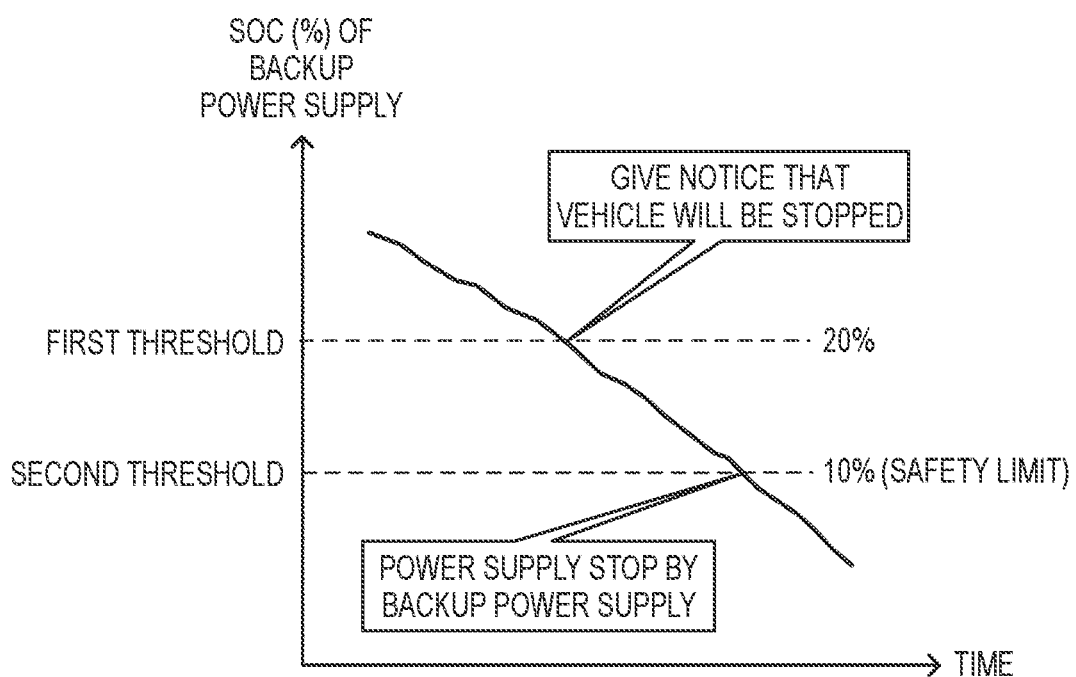
FIG. 5 is a diagram illustrating a state of a backup power supply according to the embodiment.

4. State of Backup Power Supply During Fail-Safe Control Due to Main Power Supply Failure Next, a state of the backup power supply 20 during the fail-safe control due to the failure of the main power supply 10 will be described with reference to FIG. 5. FIG. 5 is a diagram illustrating the state of the backup power supply 20 according to the embodiment.

When the failure of the main power supply 10 is detected, the controller 3 performs a fail-safe control in which the inter-system switch 41 is interrupted, the battery switch 42 is conducted, and the electric power from the backup power supply 20 is supplied to the second load 103 (see FIG. 3).

Therefore, as illustrated in FIG. 5, the SOC of the backup power supply 20 decreases with time. At this time, if the power supply is not limited and the SOC continues to decrease beyond the safety limit, that is, when the overdischarge is continued, the backup power supply 20 may not be used again.

Therefore, when the state value indicating the charging state of the backup power supply 20 decreases to a first threshold during the fail-safe control using the backup power supply 20, the controller 3 executes an advance notice process for giving a user notice that the vehicle will be stopped. For example, the controller 3 transmits a command to the external device 100 to cause the notification device 200 to give a notification such as "Please stop the vehicle immediately. Even though the vehicle is not stopped, the vehicle will forcibly be stopped."

The state value here is, for example, the SOC of the backup power supply 20. The state value may be an output voltage of the backup power supply 20. The first threshold is set to be larger than the safety limit, and is set to a value with which the external device 100 may continue the retreat travel for a predetermined time. The predetermined time here is, for example, 15 s. In this case, the first threshold is set to 20%. Accordingly, the user may stop the vehicle by following the notification before the vehicle is forcibly stopped.

In a case where the user does not stop the vehicle and the state value of the backup power supply 20 decreases to a second threshold which is lower than the first threshold and which indicates a safety limit of the backup power supply 20, the controller 3 executes a power supply stop process for stopping the power supply by the backup power supply 20. For example, when the SOC of the backup power supply 20 decreases to 10%, the controller 3 interrupts the battery switch 42 to forcibly stop the power supply by the backup power supply 20.

In this way, the controller 3 gives advance notice to the user that the vehicle is forcibly stopped, and forcibly stops the vehicle in response to the SOC of the backup power supply 20 decreasing to the safety limit. Therefore, the power supply control device 1 may end retreat travel without confusing the driver while preventing a failure of the backup power supply 20.

In a case where the controller 3 receives the retreat travel completion notification from the external device 100 before the SOC of the backup power supply 20 decreases to the first threshold, the controller 3 does not execute the advance notice process and the power supply stop process.

That is, during the fail-safe control using the backup power supply 20, in a case where the controller 3 does not receive the retreat travel completion notification from the external device 100 that executes the retreat travel control of the vehicle, the controller 3 executes the advance notice process and the power supply stop process.

Accordingly, when the retreat travel by the external device 100 is safely completed, the controller 3 does not execute the unnecessary advance notice process and power supply stop process, and does not annoy the user. Hereinafter, the processes executed by the controller 3 will be specifically described.

5. Process Executed by Controller

Next, processes executed by the controller 3 will be described with reference to FIGS. 6 to 11. FIGS. 6 to 11 are flowcharts illustrating an example of processes executed by the controller 3 according to the embodiment. In the power supply control device 1, during a period in which an ignition switch (IG) of the vehicle is not turned on, that is, while the IG is turned off, the inter-system switch 41 and the battery switch 42 are in an interrupted state.

5.1. Main Process

Figure 6:
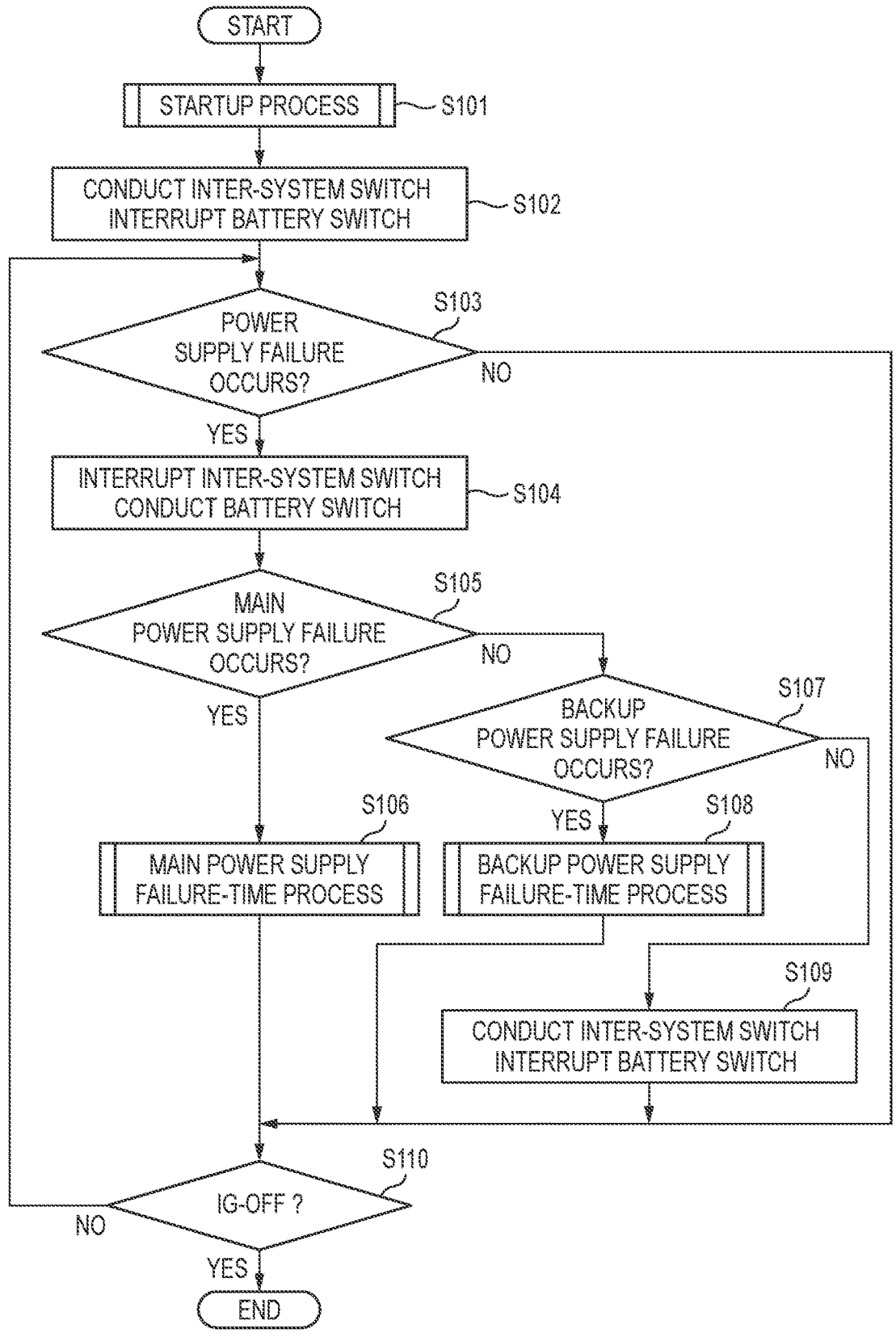
FIG. 6 is a flowchart illustrating an example of a process executed by a controller according to the embodiment.

When the IG of the vehicle is turned on, the controller 3 starts a main process illustrated in FIG. 6. Specifically, as illustrated in FIG. 6, when the IG is turned on, the controller 3 first executes a startup process (step S101). A specific example of the startup process will be described later with reference to FIGS. 8 and 10.

Subsequently, the controller 3 conducts the inter-system switch 41 and interrupts the battery switch 42 (step S102). Thereafter, the controller 3 determines whether a power supply failure occurs (step S103).

In a case where it is determined that no power supply failure occurs (step S103, No), the controller 3 moves the process to step S110. In a case where it is temporarily determined that a power supply failure occurs (step S103, Yes), the controller 3 interrupts the inter-system switch 41 and conducts the battery switch 42 (step S104). Accordingly, the power supply control device 1 is in a pre-interruption state illustrated in FIG. 2.

Subsequently, the controller 3 determines whether a failure occurs in the main power supply 10 (step S105). In a case where it is confirmed that a failure occurs in the main power supply 10 (step S105, Yes), the controller 3 executes a main power supply failure-time process (step S106), and moves the process to step S110. A specific example of the main power supply failure-time process will be described later with reference to FIGS. 7 and 9.

In a case where it is confirmed that no failure occurs in the main power supply 10 (step S105, No), the controller 3 determines whether a failure occurs in the backup power supply 20 (step S107).

In a case where it is confirmed that a failure occurs in the backup power supply 20 (step S107, Yes), the controller 3 executes a backup power supply failure-time process (step S108), and moves the process to step S110. Details of the backup power supply failure-time process will be described later with reference to FIG. 11.

In a case where it is confirmed that no failure occurs in the backup power supply 20 (step S107, No), the controller 3 confirms that no power supply failure occurs, conducts the inter-system switch 41, and interrupts the battery switch 42 (step S109). Accordingly, the power supply control device 1 returns to a normal operation state illustrated in FIG. 1. Thereafter, the controller 3 moves the process to step S110.

In step S110, the controller 3 determines whether the IG is turned off. In a case where it is determined that the IG is not turned off (step S110, No), the controller 3 moves the process to step S103. In a case where it is determined that the IG is turned off (step S110, Yes), the controller 3 ends the main process.

5.2. Main Power Supply Failure-Time Process

Figure 7:
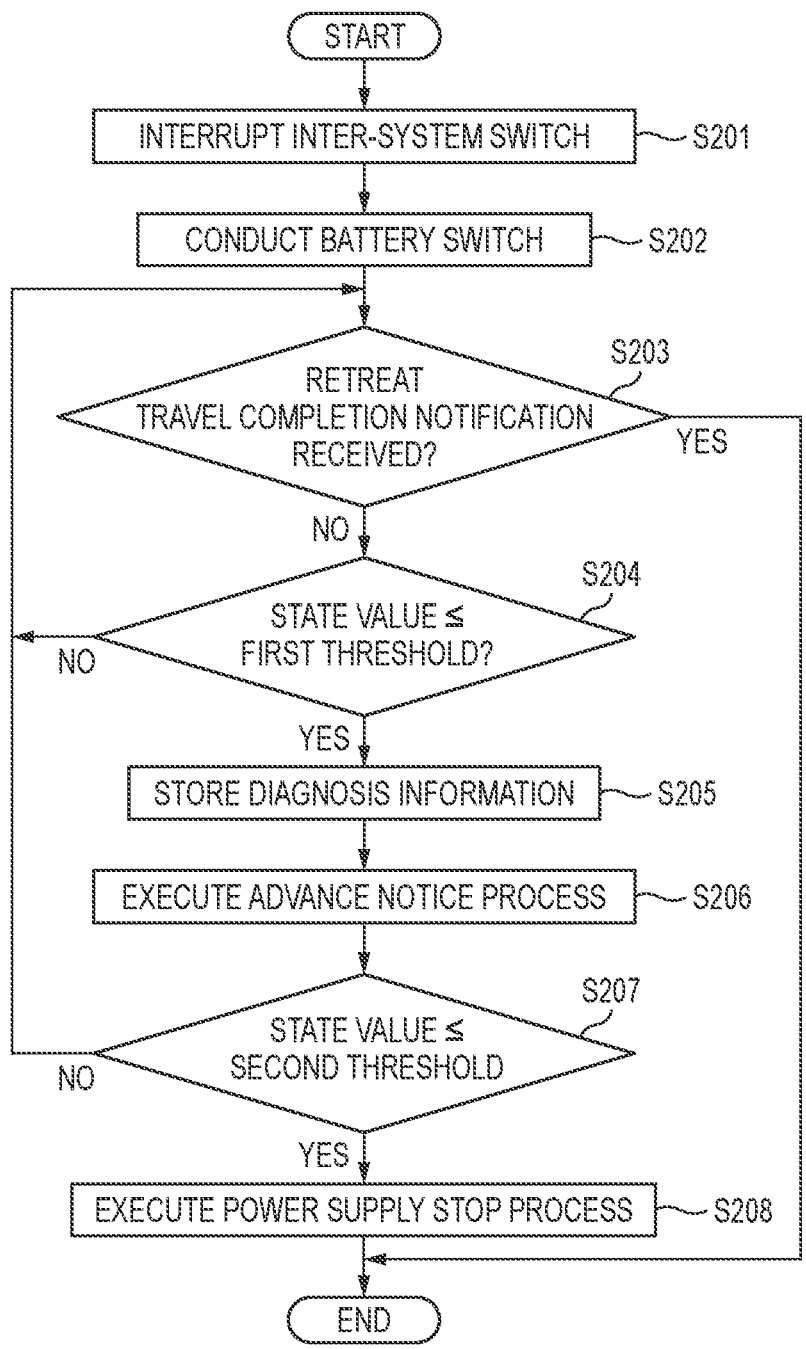
FIG. 7 is a flowchart illustrating an example of a temporary determination process executed by the controller according to the embodiment.

Next, the main power supply failure-time process (step S106 illustrated in FIG. 6) will be described with reference to FIG. 7. As illustrated in FIG. 7, when the main power supply failure-time process is started, the controller 3 maintains the interruption of the inter-system switch 41 (step S201), and maintains the conduction of the battery switch 42 (step S202). Accordingly, the power supply control device 1 is in a state illustrated in FIG. 3, and may supply the electric power from the backup power supply 20 to the second load 103 via the second system 120.

Subsequently, the controller 3 determines whether the retreat travel completion notification is received from the external device 100 (step S203). In a case where it is determined that the retreat travel completion notification is received (step S203, Yes), the controller 3 ends the main power supply failure-time process.

In a case where it is determined that the retreat travel completion notification is not received (step S203, No), the controller 3 determines whether the state value of the backup power supply 20 is equal to or smaller than the first threshold (step S204). In a case where it is determined that the state value of the backup power supply 20 is not equal to or smaller than the first threshold (step S204, No), that is, in a case where it is determined that the state value of the backup power supply 20 is larger than the first threshold, the controller 3 moves the process to step S203.

In a case where it is determined that the state value of the backup power supply 20 is equal to or smaller than the first threshold (step S204, Yes), the controller 3 stores, in the nonvolatile memory 31, the diagnosis information 32 indicating that a failure occurs in the main power supply 10 (step S205).

Then, the controller 3 executes an advance notice process for giving the user advance notice that the vehicle will be stopped (step S206). For example, the controller 3 transmits a command to the external device 100 to cause the notification device 200 to give a notification such as "Please stop the vehicle immediately. Even though the vehicle is not stopped, the vehicle will forcibly be stopped.".

Thereafter, the controller 3 determines whether the state value of the backup power supply 20 is equal to or smaller than the second threshold (step S207). In a case where it is determined that the state value of the backup power supply 20 is not equal to or smaller than the second threshold (step S207, No), that is, when determining that the state value of the backup power supply 20 is larger than the second threshold and equal to or smaller than the first threshold, the controller 3 returns the process to step S203.

In a case where it is determined that the state value of the backup power supply 20 is equal to or smaller than the second threshold (step S207, Yes), the controller 3 forcibly interrupts the battery switch 42, executes a power supply stop process for stopping the power supply by the backup power supply 20 (step S208), and ends the main power supply failure-time process.

Therefore, in a state where the state value of the backup power supply 20 is equal to or larger than the first threshold, when the retreat travel completion notification is received from the external device 100 (step S203, Yes), the processes of step S205, step S206, and step S208 are not executed. Further, in a state where the state value of the backup power supply 20 is equal to or smaller than the first threshold and larger than the second threshold, when the retreat travel completion notification is received from the external device 100 (step S203, Yes), the processes of step S205 and step S206 are executed, but the process of step S208 is not executed. The processes of step S205 and step S206 are executed only once after it is determined as Yes in step S204.

5.3. Startup Process

Figure 8:
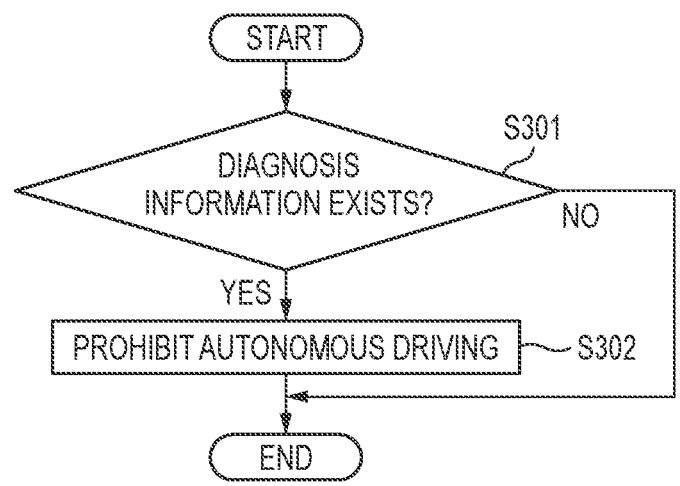
FIG. 8 is a flowchart illustrating an example of a process executed by the controller according to the embodiment.

Next, the startup process (step S101 illustrated in FIG. 6) will be described with reference to FIG. 8. As illustrated in FIG. 8, when the startup process is started, the controller 3 first determines whether the diagnosis information 32 exists in the nonvolatile memory 31 (step S301).

In a case where the diagnosis information 32 is not stored in the nonvolatile memory 31, the controller 3 determines that there is no diagnosis information 32 (step S301, No), and ends the startup process.

If the diagnosis information 32 is stored in the nonvolatile memory 31, the controller 3 determines that there is the diagnosis information 32 (step S301, Yes), and prohibits the autonomous driving (step S302).

Specifically, the fact that the diagnosis information 32 is stored in the nonvolatile memory 31 indicates that a power supply abnormality has been occurred in a previous trip from the previous IG-on to the IG-off. Accordingly, there is a high possibility that the power supply abnormality continues even in a current trip. Therefore, the controller 3 prohibits the autonomous driving by the external device 100 by outputting, to the external device 100, the autonomous driving prohibition signal indicating that the autonomous driving is disabled. Thereafter, the controller 3 ends the startup process.

5.4. Modifications of Main Power Supply Failure-Time Process and Startup Process Various modifications may be made to the main power supply failure-time process illustrated in FIG. 7 and the startup process illustrated in FIG. 8. For example, the controller 3 may be configured to execute the main power supply failure-time process illustrated in FIG. 9.

Figure 9:
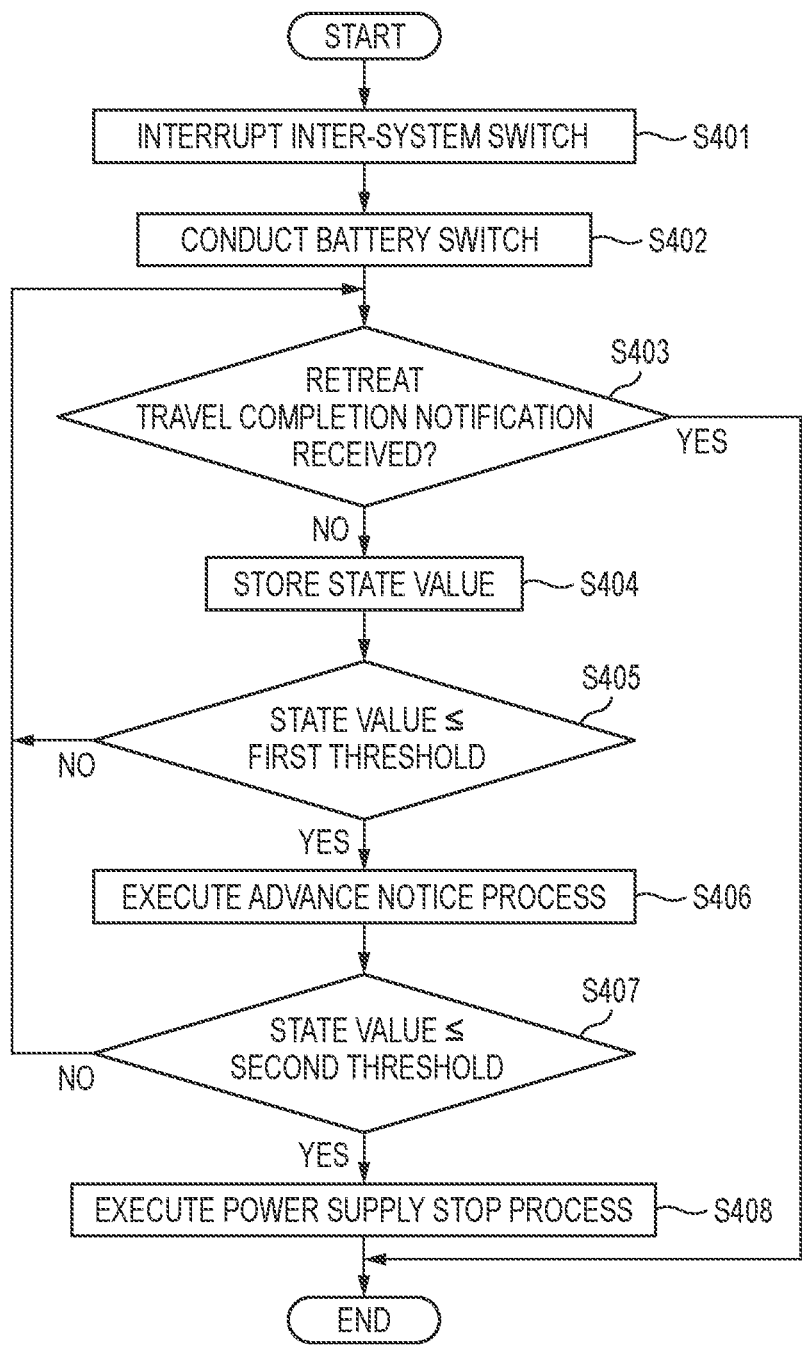
FIG. 9 is a flowchart illustrating an example of a process executed by the controller according to the embodiment.

In this case, as illustrated in FIG. 9, when the main power supply failure-time process is started, the controller 3 maintains the interruption of the inter-system switch 41 (step S401), and maintains the conduction of the battery switch 42 (step S402). Accordingly, the power supply control device 1 is in a state illustrated in FIG. 3, and may supply the electric power from the backup power supply 20 to the second load 103 via the second system 120.

Subsequently, the controller 3 determines whether the retreat travel completion notification is received from the external device 100 (step S403). In a case where it is determined that the retreat travel completion notification is received (step S403, Yes), the controller 3 ends the main power supply failure-time process.

In a case where it is determined that the retreat travel completion notification is not received (step S403, No), the controller 3 stores the state value of the backup power supply 20 in the nonvolatile memory 31 (step S404).

The controller 3 determines whether the state value of the backup power supply 20 is equal to or smaller than the first threshold (step S405). In a case where it is determined that the state value of the backup power supply 20 is not equal to or smaller than the first threshold (step S405, No), that is, in a case where it is that the state value of the backup power supply 20 is larger than the first threshold, the controller 3 moves the process to step S403.

In a case where it is determined that the state value of the backup power supply 20 is equal to or smaller than the first threshold (step S405, Yes), the controller 3 executes the advance notice process for giving the user advance notice that the vehicle will be stopped (step S406). For example, the controller 3 transmits a command to the external device 100 to cause the notification device 200 to give a notification such as "Please stop the vehicle immediately. Even though the vehicle is not stopped, the vehicle will forcibly be stopped.". The process of step S406 is executed only once when it is determined that the state value of the backup power supply 20 is equal to or smaller than the first threshold.

Thereafter, the controller 3 determines whether the state value of the backup power supply 20 is equal to or smaller than the second threshold (step S407). In a case where it is determined that the state value of the backup power supply 20 is not equal to or smaller than the second threshold (step S407, No), that is, in a case where it is determined that the state value of the backup power supply 20 is larger than the second threshold and equal to or smaller than the first threshold, the controller 3 returns the process to step S403.

In a case where it is determined that the state value of the backup power supply 20 is equal to or smaller than the second threshold (step S407, Yes), the controller 3 executes the power supply stop process for stopping the power supply by the backup power supply 20 (step S408), and ends the main power supply failure-time process.

As described above, when a failure of the main power supply 10 is detected, the controller 3 periodically stores the state value of the backup power supply 20 in the nonvolatile memory 31 during the fail-operational control. Accordingly, the nonvolatile memory 31 stores the state value of the backup power supply 20 immediately before the retreat travel completion notification is received from the external device 100 after the main power supply 10 fails, or the state value immediately before the state value is equal to or smaller than the second threshold. When executing the main power supply failure-time process illustrated in FIG. 9, the controller 3 executes the startup process illustrated in FIG. 10 at the time of the next startup.

Figure 10:
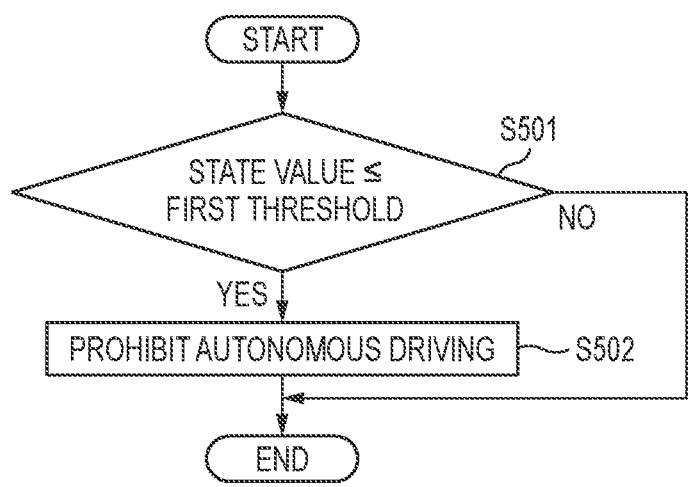
FIG. 10 is a flowchart illustrating an example of the process executed by the controller according to the embodiment.

Specifically, as illustrated in FIG. 10, when the startup process is started, the controller 3 first determines whether the state value of the backup power supply 20 stored in the nonvolatile memory 31 is equal to or smaller than the first threshold (step S501). The fact that the state value of the backup power supply 20 is equal to or smaller than the first threshold indicates that the power supply abnormality occurs during the previous trip from the previous IG-on to the IG-off. Accordingly, there is a high possibility that the power supply abnormality continues even in a current trip.

In a case where it is determined that the state value of the backup power supply 20 is not equal to or smaller than the first threshold (step S501, No), that is, in a case where it is determined that no power supply abnormality occurs in the previous trip, the controller 3 ends the startup process. In a case where it is determined that the state value of the backup power supply 20 is equal to or smaller than the first threshold (step S501, Yes), the controller 3 determines that there is a high possibility that the power supply abnormality occurs in the previous trip and the power supply abnormality continues even in the current trip, and prohibits the autonomous driving (step S502).

Specifically, the controller 3 prohibits the autonomous driving by the external device 100 by outputting, to the external device 100, the autonomous driving prohibition signal indicating that the autonomous driving is disabled. Thereafter, the controller 3 ends the startup process.

Accordingly, the power supply control device 1 may prevent the autonomous driving from being erroneously performed by the external device 100 even though the failure of the backup power supply 20 is not resolved at the time of the next startup after the retreat travel is completed.

5.5. Backup Power Supply Failure-Time Process

Figure 11:
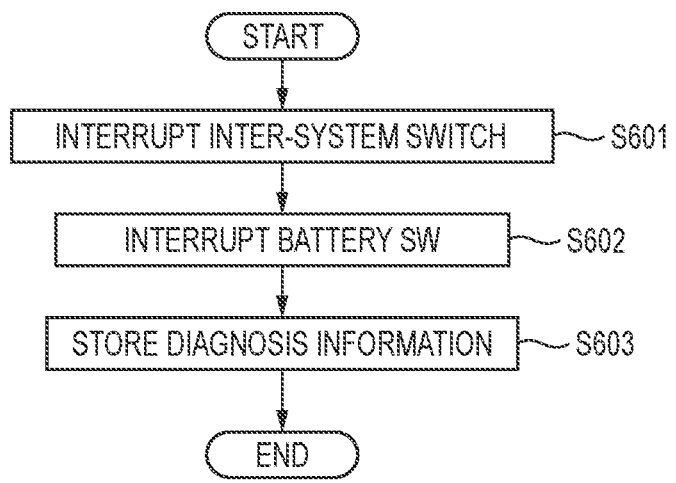
FIG. 11 is a flowchart illustrating an example of the process executed by the controller according to the embodiment.

Next, a backup power supply failure-time process (step S108 illustrated in FIG. 6) will be described with reference to FIG. 11. As illustrated in FIG. 11, when the backup power supply failure-time process is started, the controller 3 first maintains the interruption of the inter-system switch 41 (Step S601), and interrupts the battery switch 42 (step S602). Accordingly, the power supply control device 1 is in a state illustrated in FIG. 4, and may supply the electric power from the main power supply 10 to the first load 101 via the first system 110.

Subsequently, the controller 3 stores, in the nonvolatile memory 31, diagnosis information indicating that a failure occurs in the backup power supply 20 (step S603), and ends the backup power supply failure-time process.

As described above, when the failure of the backup power supply 20 is detected, the controller 3 executes a fail-safe control in which the inter-system switch 41 is interrupted and the electric power from the main power supply 10 is supplied to the first load 101, and stores the diagnosis information 32 in the nonvolatile memory 31.

Therefore, when the startup process illustrated in FIG. 8 is executed at the time of the next startup, if the diagnosis information 32 is stored in the nonvolatile memory 31, the controller 3 prohibits the autonomous driving by the external device 100.

Accordingly, the power supply control device 1 may prevent the autonomous driving from being erroneously performed by the external device 100 even though the failure of the backup power supply 20 is not resolved at the time of the next startup after the retreat travel is completed.

6. Appendix

As an appendix, the features of the present disclosure are illustrated below.

(1) A power supply control device including:
  a controller configured to control a connector, the connector being capable of connecting and interrupting a first system and a second system, the first system being configured to supply electric power from a main power supply to a first load, the second system being configured to supply electric power from a backup power supply to a second load, in which
  the controller is configured to:
    in response to a failure of the main power supply being detected, execute a fail-safe control in which the connector is interrupted and the electric power from the backup power supply is supplied to the second load;
    in response to a state value indicating a charging state of the backup power supply decreasing to a first threshold during the fail-safe control, execute an advance notice process for giving a user advance notice that a vehicle will be stopped; and
    in response to the state value decreasing to a second threshold which is smaller than the first threshold and which indicates a safety limit of the backup power supply, execute a power supply stop process for stopping supply of the electric power from the backup power supply.

(2) The power supply control device according to (1), in which
  the controller is configured to execute the advance notice process and the power supply stop process unless a retreat travel completion notification is received from an external device that executes a retreat travel control of the vehicle during the fail-safe control.

(3) The power supply control device according to (1) or (2), in which,
  the controller stores, in response to the state value decreasing to the first threshold, diagnosis information in a nonvolatile memory, and
  the controller prohibits autonomous driving in a case where the diagnosis information is stored in the nonvolatile memory at a time of a startup of the vehicle.

(4) The power supply control device according to (1) or (2), in which
  the controller is configured to, in response to the failure of the main power supply being detected, periodically store the state value in a nonvolatile memory during the fail-safe control, read the state value from the nonvolatile memory at a time of a startup of the vehicle, and prohibit autonomous driving in response to the read state value being equal to or smaller than the first threshold.

(5) The power supply control device according to any one of (1) to (3), in which,
  the controller is configured to execute, in response to a failure of the backup power supply being detected, a fail-safe control in which the connector is interrupted and the electric power from the main power supply is supplied to the first load, store diagnosis information in a nonvolatile memory, and prohibit, at a time of a startup of the vehicle, autonomous driving in response to the diagnosis information being stored in the nonvolatile memory.

(6) A power supply control method including:
  by a controller of a power supply control device, the controller configured to control a connector capable of connecting and interrupting a first system and a second system, the first system being configured to supply electric power from a main power supply to a first load, the second system being configured to supply electric power from a backup power supply to a second load,
  in response to a failure of the main power supply being detected, executing a fail-safe control in which the connector is interrupted and the electric power from the backup power supply is supplied to the second load;
  in response to a state value indicating a charging state of the backup power supply decreasing to a first threshold during the fail-safe control, executing an advance notice process for giving a user advance notice that a vehicle will be stopped; and
  in response to the state value decreasing to a second threshold which is lower than the first threshold and which indicates a safety limit of the backup power supply, executing a power supply stop process for stopping supply of the electric power from the backup power supply Further effects and modifications may be easily derived by those skilled in the art. Therefore, broader aspects of the present invention are not limited to the specific details and representative embodiments illustrated and described above. Therefore, various modifications may be made without departing from the spirit or scope of the general inventive concept as defined by the appended claims and equivalents thereof.

What is claimed is:

1. A power supply control device comprising:
  a controller configured to control a connector, the connector being capable of connecting and interrupting a first system and a second system, the first system being configured to supply electric power from a main power supply to a first load, the second system being configured to supply electric power from a backup power supply to a second load, wherein
  the controller is configured to:
    in response to a failure of the main power supply being detected, execute a fail-safe control in which the connector is interrupted and the electric power from the backup power supply is supplied to the second load;
    in response to a state value indicating a charging state of the backup power supply decreasing to a first threshold during the fail-safe control, execute an advance notice process for giving a user advance notice that a vehicle will be stopped; and in response to the state value decreasing to a second threshold which is smaller than the first threshold and which indicates a safety limit of the backup power supply, execute a power supply stop process for stopping supply of the electric power from the backup power supply; and in response to the failure of the main power supply being detected, (i) periodically store the state value in a nonvolatile memory during the fail-safe control, (ii) read the state value from the nonvolatile memory at a time of a startup of the vehicle, and (iii) prohibit autonomous driving in response to the read state value being equal to or smaller than the first threshold.

2. The power supply control device according to claim 1, wherein
the controller is configured to execute the advance notice process and the power supply stop process unless a retreat travel completion notification is received from an external device that executes a retreat travel control of the vehicle during the fail-safe control.

3. The power supply control device according to claim 1, wherein
the controller stores, in response to the state value decreasing to the first threshold, diagnosis information in the nonvolatile memory, and
the controller prohibits autonomous driving in a case where the diagnosis information is stored in the nonvolatile memory at the time of the startup of the vehicle.

4. The power supply control device according to claim 2, wherein,
the controller stores, in response to the state value decreasing to the first threshold, diagnosis information in the nonvolatile memory, and
the controller prohibits autonomous driving in a case where the diagnosis information is stored in the nonvolatile memory at the time of the startup of the vehicle.

5. The power supply control device according to claim 1, wherein
the controller is configured to execute, in response to a failure of the backup power supply being detected, a fail-safe control in which the connector is interrupted and the electric power from the main power supply is supplied to the first load, store diagnosis information in the nonvolatile memory, and prohibit, at the time of the startup of the vehicle, autonomous driving in response to the diagnosis information being stored in the nonvolatile memory.

6. The power supply control device according to claim 2, wherein
the controller is configured to execute, in response to a failure of the backup power supply being detected, a fail-safe control in which the connector is interrupted and the electric power from the main power supply is supplied to the first load, store diagnosis information in the nonvolatile memory, and prohibit, at the time of the startup of the vehicle, autonomous driving in response to the diagnosis information being stored in the nonvolatile memory.

7. The power supply control device according to claim 3, wherein
the controller is configured to execute, in response to a failure of the backup power supply being detected, a fail-safe control in which the connector is interrupted and the electric power from the main power supply is supplied to the first load, store the diagnosis information in the nonvolatile memory, and prohibit, at the time of the startup of the vehicle, autonomous driving in response to the diagnosis information being stored in the nonvolatile memory.

8. The power supply control device according to claim 4, wherein
the controller is configured to execute, in response to a failure of the backup power supply being detected, a fail-safe control in which the connector is interrupted and the electric power from the main power supply is supplied to the first load, store the diagnosis information in the nonvolatile memory, and prohibit, at the time of the startup of the vehicle, autonomous driving in response to the diagnosis information being stored in the nonvolatile memory.

9. A power supply control device comprising:
a controller configured to control a connector, the connector being capable of connecting and interrupting a first system and a second system, the first system being configured to supply electric power from a main power supply to a first load, the second system being configured to supply electric power from a backup power supply to a second load, wherein
the controller is configured to:
in response to a failure of the main power supply being detected, execute a fail-safe control in which the connector is interrupted and the electric power from the backup power supply is supplied to the second load;
in response to a state value indicating a charging state of the backup power supply decreasing to a first threshold during the fail-safe control, execute an advance notice process for giving a user advance notice that a vehicle will be stopped;
in response to the state value decreasing to a second threshold which is smaller than the first threshold and which indicates a safety limit of the backup power supply, execute a power supply stop process for stopping supply of the electric power from the backup power supply; and
execute the advance notice process and the power supply stop process unless a retreat travel completion notification is received from an external device that executes a retreat travel control of the vehicle during the fail-safe control.

10. The power supply control device according to claim 9, wherein
the controller stores, in response to the state value decreasing to the first threshold, diagnosis information in a nonvolatile memory, and
the controller prohibits autonomous driving in a case where the diagnosis information is stored in the nonvolatile memory at a time of a startup of the vehicle.

11. The power supply control device according to claim 9, wherein
the controller is configured to execute, in response to a failure of the backup power supply being detected, a fail-safe control in which the connector is interrupted and the electric power from the main power supply is supplied to the first load, store diagnosis information in a nonvolatile memory, and prohibit, at a time of a startup of the vehicle, autonomous driving in response to the diagnosis information being stored in the nonvolatile memory.

12. The power supply control device according to claim 10, wherein
the controller is configured to execute, in response to a failure of the backup power supply being detected, a fail-safe control in which the connector is interrupted and the electric power from the main power supply is supplied to the first load, store the diagnosis information in the nonvolatile memory, and prohibit, at the time of the startup of the vehicle, autonomous driving in response to the diagnosis information being stored in the nonvolatile memory.

13. A power supply control device comprising:
a controller configured to control a connector, the connector being capable of connecting and interrupting a first system and a second system, the first system being configured to supply electric power from a main power supply to a first load, the second system being configured to supply electric power from a backup power supply to a second load, wherein
the controller is configured to:
in response to a failure of the main power supply being detected, execute a fail-safe control in which the connector is interrupted and the electric power from the backup power supply is supplied to the second load;
in response to a state value indicating a charging state of the backup power supply decreasing to a first threshold during the fail-safe control, execute an advance notice process for giving a user advance notice that a vehicle will be stopped;
in response to the state value decreasing to a second threshold which is smaller than the first threshold and which indicates a safety limit of the backup power supply, execute a power supply stop process for stopping supply of the electric power from the backup power supply;
in response to the state value decreasing to the first threshold, store diagnosis information in a nonvolatile memory; and
prohibit autonomous driving in a case where the diagnosis information is stored in the nonvolatile memory at a time of a startup of the vehicle.

14. The power supply control device according to claim 13, wherein
the controller is configured to execute, in response to a failure of the backup power supply being detected, a fail-safe control in which the connector is interrupted and the electric power from the main power supply is supplied to the first load, store the diagnosis information in the nonvolatile memory, and prohibit, at the time of the startup of the vehicle, autonomous driving in response to the diagnosis information being stored in the nonvolatile memory.

\* \* \* \* \*